(12) United States Patent
Subbaiahthever et al.

(10) Patent No.: US 8,896,988 B2
(45) Date of Patent: Nov. 25, 2014

(54) SYSTEM HAVING ELECTRICAL EQUIPMENT INTEGRATED ON A STRUCTURE AND A METHOD FOR ISOLATION OF ELECTRICAL EQUIPMENT THEREOF

(75) Inventors: Dukkaiappan Subbaiahthever, Nashik (IN); Ramesh Viswanathan, Nashik (IN); Balachandra Narayan Varade, Nashik (IN); Maheswaran Chandrasekaran, Nashik (IN); Satish Baburao Bhalerao, Nashik (IN); Kishor Bhikaji Wadhe, Nashik (IN)

(73) Assignee: ABB Technology AG, Zurich (CH)

( * ) Notice: Subject to any disclaimer, the term of this patent is extended or adjusted under 35 U.S.C. 154(b) by 246 days.

(21) Appl. No.: 13/452,195

(22) Filed: Apr. 20, 2012

(65) Prior Publication Data
US 2012/0293920 A1 Nov. 22, 2012

Related U.S. Application Data

(63) Continuation of application No. PCT/IB2009/007698, filed on Dec. 9, 2009.

(30) Foreign Application Priority Data

Oct. 20, 2009 (IN) ............................ 2535/CHE/2009

(51) Int. Cl.
*H02B 7/00* (2006.01)
*H05K 7/00* (2006.01)
*H02B 5/02* (2006.01)

(52) U.S. Cl.
CPC ........................................ *H02B 5/02* (2013.01)
USPC ........... 361/620; 361/602; 361/603; 361/605; 361/622; 361/623; 200/48 R; 200/48 P; 200/50.21; 200/50.25; 200/17 R; 200/50.38; 218/118; 218/119; 218/140; 218/154

(58) Field of Classification Search
USPC ........ 361/601, 603, 604, 605, 606, 607, 609, 361/611, 615, 620, 623; 200/17 R, 48 A, 200/48 P, 48 R, 50.21, 50.25, 50.26, 331; 218/3, 9, 10, 44, 52, 59, 81, 140, 153, 218/154, 118, 119
See application file for complete search history.

(56) References Cited

U.S. PATENT DOCUMENTS 2,354,991 A * 8/1944 Gussow et al. .............. 200/48 P
2,885,502 A * 5/1959 Eichelberger et al. ..... 200/50.25
(Continued)

FOREIGN PATENT DOCUMENTS

DE 295 08 637 U1 5/1996

OTHER PUBLICATIONS

International Search Report (PCT/ISA/210) issued on Sep. 30, 2010, by Indian Patent Office as the International Searching Authority for International Application No. PCT/IB2009/007698.

*Primary Examiner* — Michail V Datskovskiy
(74) *Attorney, Agent, or Firm* — Buchanan Ingersoll & Rooney PC (57) ABSTRACT

A system having electrical equipment integrated on a structure is provided. The system includes at least one electrical equipment located at a spaced apart relationship and mounted on at least one structure. A method is provided for isolation of electrical equipment. The method includes opening and closing a contact by engaging or disengaging one or more terminals of the electrical equipment correspondingly with a supply line or a distribution line by a mechanism for isolation. The mechanism can be a handle or a moving mechanism which is associated with a movement in a vertical direction or horizontal direction or with a movement that provides isolation.

20 Claims, 11 Drawing Sheets

(56) References Cited

U.S. PATENT DOCUMENTS

| | | | | |
|---|---|---|---|---|
| 3,015,756 A * | 1/1962 | Kreekon et al. | | 361/607 |
| 3,163,736 A * | 12/1964 | Mikos et al. | | 218/3 |
| 3,219,771 A * | 11/1965 | Umphrey | | 200/50.25 |
| 3,441,692 A * | 4/1969 | Wolf et al. | | 200/48 R |
| 3,508,179 A * | 4/1970 | Evans et al. | | 335/68 |
| 3,571,543 A * | 3/1971 | Perkins et al. | | 218/10 |
| 3,579,045 A * | 5/1971 | Keogh et al. | | 361/615 |
| 3,697,819 A * | 10/1972 | Eichelberger et al. | | 361/603 |
| 3,710,044 A * | 1/1973 | Sharp | | 200/50.25 |
| 3,783,209 A * | 1/1974 | Cleaveland et al. | | 200/50.25 |
| 4,002,864 A * | 1/1977 | Kuhn et al. | | 200/50.21 |
| 4,017,698 A * | 4/1977 | Kuhn et al. | | 200/50.21 |
| 4,105,878 A * | 8/1978 | Date et al. | | 218/10 |
| 4,317,160 A * | 2/1982 | Tillson et al. | | 361/609 |
| 4,396,813 A * | 8/1983 | Hesselbart et al. | | 200/50.21 |
| 4,434,334 A * | 2/1984 | Tragesser | | 218/52 |
| 4,677,262 A * | 6/1987 | Ramos et al. | | 200/48 A |
| 4,752,859 A * | 6/1988 | Chabala et al. | | 361/602 |
| 4,788,392 A * | 11/1988 | Asai | | 218/44 |
| 5,091,616 A * | 2/1992 | Ramos et al. | | 218/9 |
| 5,459,293 A * | 10/1995 | Hodkin et al. | | 200/50.26 |
| 5,483,032 A * | 1/1996 | Trayer et al. | | 218/91 |
| 5,587,873 A * | 12/1996 | Sakai et al. | | 361/603 |
| 5,757,260 A * | 5/1998 | Smith et al. | | 337/186 |
| 5,764,472 A * | 6/1998 | Schuld | | 361/602 |
| 6,127,637 A | 10/2000 | Estey et al. | | |
| 6,433,998 B2 * | 8/2002 | Arioka et al. | | 361/606 |
| 6,490,149 B2 * | 12/2002 | Shichida et al. | | 361/605 |
| 6,678,151 B2 * | 1/2004 | Costante | | 361/602 |
| 6,781,079 B1 * | 8/2004 | Hillegers | | 218/154 |
| 7,026,558 B1 * | 4/2006 | Andreyo | | 200/17 R |
| 8,294,051 B2 * | 10/2012 | Park et al. | | 200/50.21 |

* cited by examiner

SYSTEM HAVING ELECTRICAL EQUIPMENT INTEGRATED ON A STRUCTURE AND A METHOD FOR ISOLATION OF ELECTRICAL EQUIPMENT THEREOF

RELATED APPLICATIONS

This application claims priority as a continuation application under 35 U.S.C. §120 to PCT/IB2009/007698, which was filed as an International Application on Dec. 9, 2009 designating the U.S., and which claims priority to Indian Application 2535/CHE/2009 filed in India on Oct. 20, 2009. The entire contents of these applications are hereby incorporated by reference in their entireties.

FIELD

The present disclosure relates to a distribution substation. More particularly, the present disclosure relates to a system having electrical equipment integrated on a structure, and to a method for providing isolation of electrical equipment.

BACKGROUND

A distribution system has an electrical substation which transfers power from a transmission system to a distribution system of a specified area or location. The electrical substation of a distribution system hereinafter referred to as a distribution substation provides power at a voltage suitable for intermediate or local distribution. The distribution substation essentially includes power switches which include components such as circuit breakers, isolators, etc., and power equipment which include instrument transformers constituting current transformer and/or voltage transformer, and distribution transformer. The power switches are generally used for switching on and isolating electrical equipment. It is required to de-energize the equipment to allow working on the equipment. It also clears the faults that may arise downstream.

The distribution substation is generally mounted outdoor and insulated by air, when such distribution substation involves medium and high voltages. The power switch components and power equipment in a distribution substation are mounted in outdoor on individual structures supporting them. This outdoor mounting tends to occupy more space, unlike a Gas Insulated Switchgear (GIS) which is characterized by indoor mounting and gas insulation, which occupies comparatively lesser space. The space that an outdoor distribution substation occupies becomes crucial when such distribution substation is to be located in a city, where availability of land is a concern or in a hilly region, where an almost flat surface for accommodating the distribution substation becomes one of the most considerate requirements. This greatly influences the cost of the land required for installing such distribution substation. A GIS, although it occupies less space, has a limitation regarding the scope for expansion of the substation and is not economical for outdoor medium voltage levels, due to higher equipment cost. In general, the distribution substation mounted outdoor is still a preferred solution with regard to the operating voltage level, scope for substation expansion and comparatively lower cost. Hence, there is a desire for an outdoor distribution substation which occupies less space and inherits all the characteristics of the outdoor mounted distribution substation.

SUMMARY

An exemplary embodiment of the present disclosure provides a system having electrical equipment integrated on a structure. The exemplary system includes at least one electrical equipment located at a spaced apart relationship and mounted on at least one structure.

An exemplary embodiment of the present disclosure provides a method for isolation of electrical equipment. The exemplary method includes opening and closing a contact by engaging or disengaging one or more terminals of electrical equipment correspondingly with at least one of a supply line and a distribution line by a mechanism for isolation. The mechanism includes at least one of a handle and a moving mechanism which is associated with at least one of (i) movement in one of a vertical direction and a horizontal direction, and (ii) movement that provides isolation.

BRIEF DESCRIPTION OF THE DRAWINGS

Additional refinements, advantages and features of the present disclosure are described in more detail below with reference to exemplary embodiments illustrated in the drawings.

DETAILED DESCRIPTION

Exemplary embodiments of the present disclosure provide a system having power switch components and power equipment, together with electrical accessories including connectors, connector cables etc. which may hereinafter referred to as electrical equipment, integrated and located on a structure. This overcomes the disadvantages of the existing setup and provides a solution in light of the drawbacks as described earlier.

Hence, the present disclosure provides the advantage of employing the electrical equipment in an integrated manner on a structure which can be mounted outdoors. This gives the further advantage of space reduction in installing the electrical equipment of a distribution substation due to the compactness achieved by integration. The installation also requires less effort and cost.

Exemplary embodiments of the present disclosure provide a system having electrical equipment which are integrated on a structure and are compact.

Exemplary embodiments of the present disclosure provide a system having electrical equipment integrated on a structure which requires less cost, space, time and effort for installation.

Exemplary embodiments of the present disclosure provide a system having electrical equipment integrated on a structure which provides vertical and horizontal isolation of the electrical equipment.

Exemplary embodiments of the present disclosure provide a method for isolation of electrical equipment.

Accordingly, the present disclosure provides a system having electrical equipment integrated on a structure, where the system includes at least one electrical equipment located at a spaced apart relationship and mounted on at least one structure.

The present disclosure also provides a method for isolation of electrical equipment. The method includes opening and closing a contact by engaging or disengaging one or more terminals of the electrical equipment correspondingly with a supply line or a distribution line, or both, by a mechanism for isolation. The mechanism can include a handle or a moving mechanism which is associated with a movement in a vertical direction or a horizontal direction, and/or with a movement that provides isolation.

Exemplary embodiments of the present disclosure provide a system having electrical equipment, arranged in a plurality of sections. The plurality of such sections is supported on one or more structures by way of integrating the electrical equipment and locating them on a base structure.

It is imperative that the arrangement of electrical equipment as implied for a section and to that of the structure thereof is mechanically stable and electrically safe for operation. The present disclosure takes cares of such mechanical stability and electrical safety requirements. Suitable reinforcement for the structure is provided, when needed, besides having the heavier components or equipment disposed at a lower level in the structure so as to ensure more mechanical stability. The electrical equipment can be arranged in the sequence of electrical connection with sufficient electrical clearance between various electrical equipment and with the structure for safe and reliable operation, and concurrently providing compactness for the arrangement. This corresponds to the electrical equipment being located at a spaced apart relationship from each other and with the structure. Suitable insulating barriers may be provided for sufficient isolation between the electrical equipment for operational safety and also to reduce the utility of the space due to air insulation. Therefore, in accordance with the present disclosure, a system having electrical equipment integrated on a structure is provided.

The electrical equipment used herein may include prefabricated equipment, and their mechanical and electrical properties can be measured and checked in advance for proper functioning prior to the installation. The electrical equipment are fixed in totality at factory and tested which involves no adjustment at the time of installation in the site.

Figure 1:
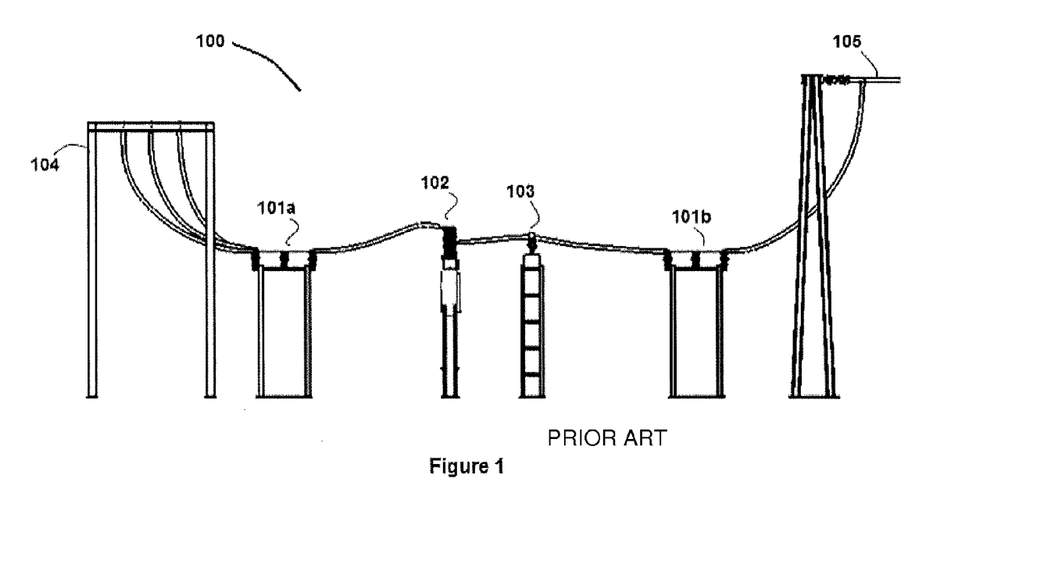
FIG. 1 shows a known distribution substation.

FIG. 1 illustrates a known distribution substation (100) which includes electrical equipment such as incoming isolator (101a), circuit breaker (102), instrument transformer (103) and outgoing isolator (101b). Each of these electrical equipment are mounted on separate mounting structure and connected to each other in a known sequence with sufficient clearance between them, as required for an outdoor installation. The supply line (104) and the distribution line (105) are connected to each of its corresponding isolators. However, this kind of arrangement and installation occupies more space. In accordance with an exemplary embodiment of the present disclosure, the need for a more compact arrangement of the distribution substation is accomplished by integrating the electrical equipment of a distribution substation in which the electrical equipment as herein above mentioned are integrated together on a structure to form a system. Such integration of the electrical equipment forming a system according to different exemplary embodiments of the present disclosure is broadly illustrated in FIGS. 2, 3 and 9.

Figure 2:
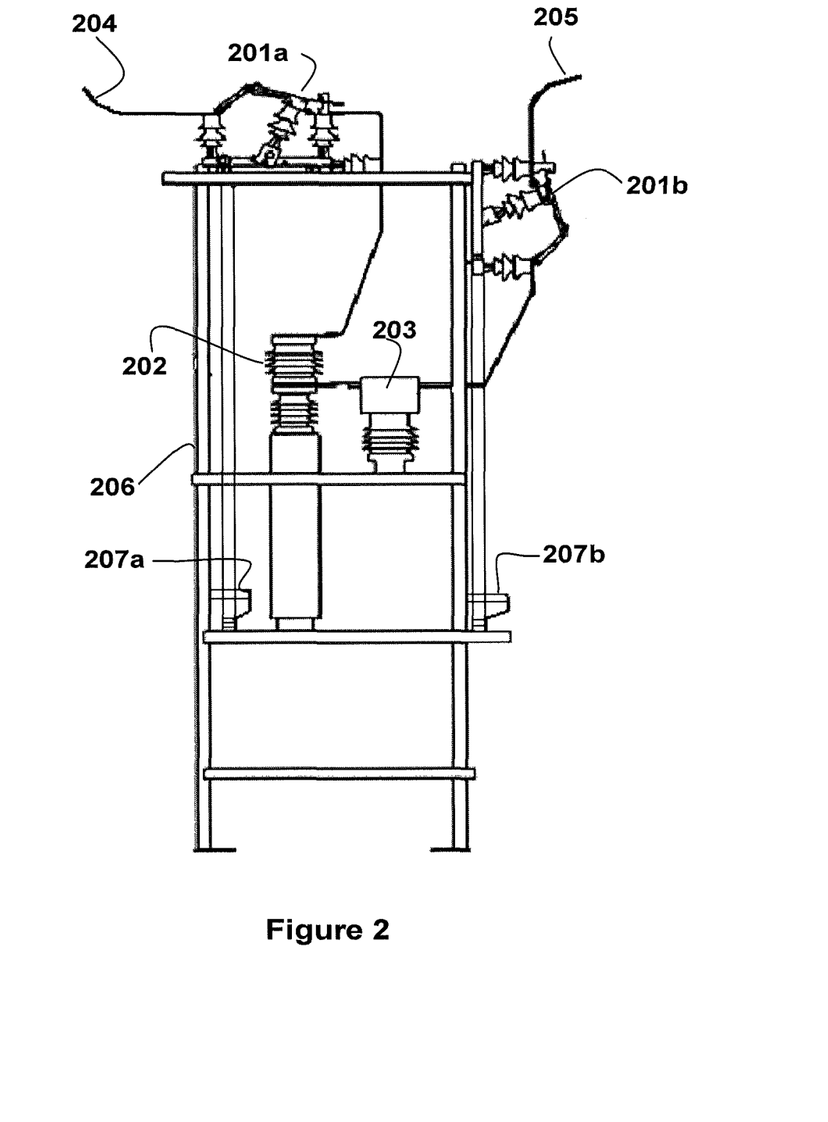
FIG. 2 shows a system according to an exemplary embodiment of the present disclosure.

FIG. 2 illustrates an exemplary embodiment of the present disclosure in which the electrical equipment including, for example, isolators (210a, 201b), a circuit breaker (202) and an instrument transformer (203) are arranged on a single frame structure (206). The supply line (204) is connected to an isolator herein referred to as an incoming isolator (201a), located on top of the single frame structure (206). The circuit breaker (202) is placed on the single frame structure (206) at a height required to provide sufficient clearance as per the standard, and one terminal of which is connected to the incoming isolator (201a). The instrument transformer (203) is also placed on the single frame structure (206) following the circuit breaker (202) with a sufficient clearance as per the standard, and one terminal of which is connected to the other terminal of the circuit breaker (202). The other terminal of the instrument transformer (203) is connected to another isolator herein referred as outgoing isolator (201b) which in turn is connected to the distribution line (205) thereof. There is also provided two handles (207a, 207b), one each for incoming and outgoing isolators (201a, 201b). The handle (207a, 207b) provides a mechanism for isolation by opening and closing the contact between the incoming isolator (201a) and the circuit breaker (202) and that between the outgoing isolator (201b) and the instrument transformer (203).

Figure 3:
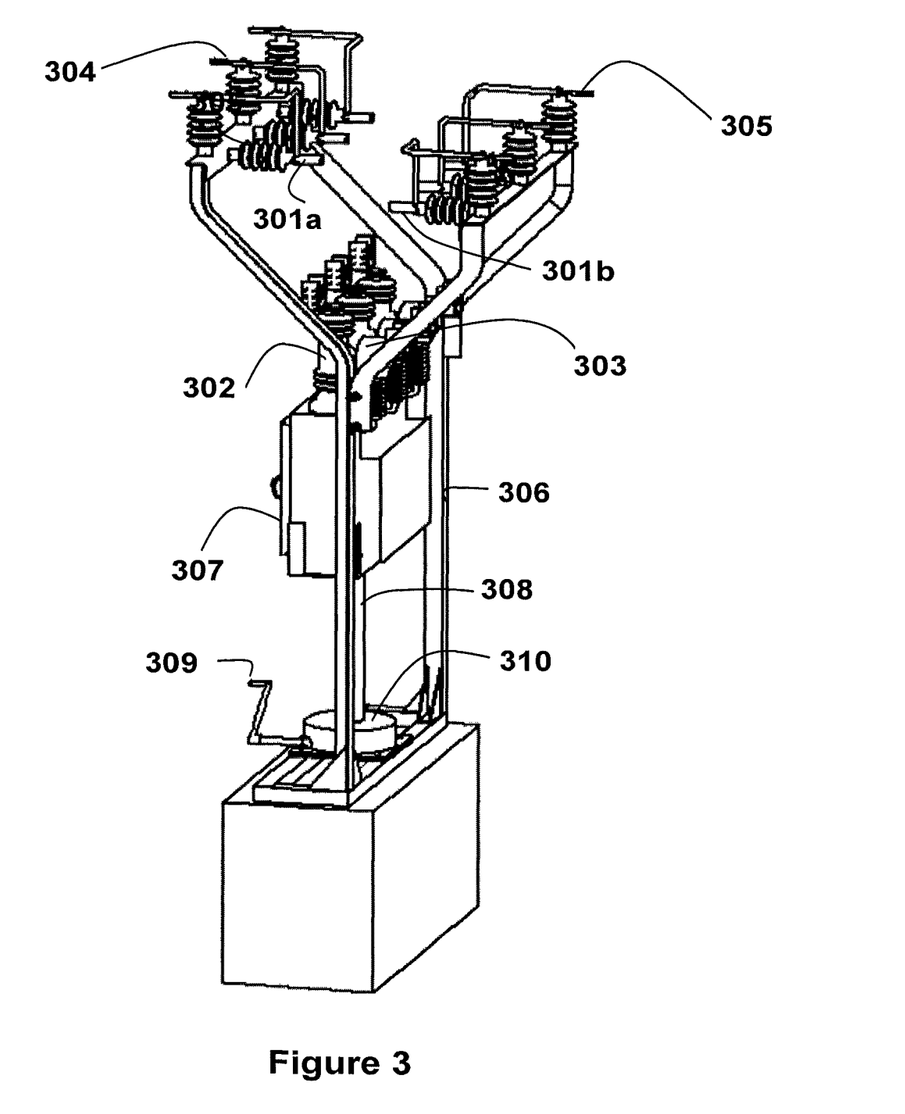
FIG. 3 shows a perspective view of a system with vertical isolation according to an exemplary embodiment of the present disclosure.

FIG. 3 illustrates a system having electrical equipment integrated on a structure according to another exemplary embodiment of the present disclosure. Here, the integration of the electrical equipment is effected by vertical isolation of the equipment. In accordance with this exemplary embodiment of the present disclosure, the incoming isolator (301a) and outgoing isolator (301b) are placed on top of a single frame structure (306) and connected to the supply line (304) and the distribution line (305), respectively. One of the terminals of the incoming isolator (301a) and of the outgoing isolator (301b) is intended to make opening or closing of contact with the corresponding terminals of the circuit breaker (302) and the instrument transformer (303) thereof. The opening and closing of the contact as stated here above is effected by a mechanism providing vertical isolation.

The circuit breaker (302) and the instrument transformer (303) are fixed on a support structure (307) containing breaker mechanism and controls. The support structure (307) has the circuit breaker (302) and instrument transformer (303) mounted on it. The electrical equipment intended to be isolated is capable of moving in a vertical direction along the vertical axis for opening or closing the contact as described herein above by engaging or disengaging the corresponding terminals of the circuit breaker (302) with the incoming isolator (301a) and that of the corresponding terminal of the instrument transformer (303) with the outgoing isolator (301b). The isolation by using the handle (207a, 207b) as inferred from the above-described embodiment is done by the vertical movement of the structure.

Figure 5:
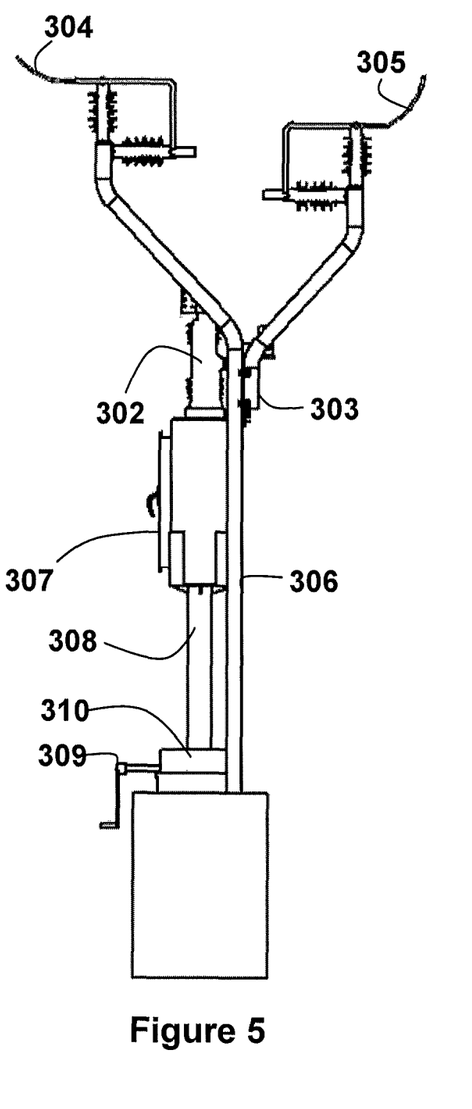
FIG. 5 shows the system of FIG. 3 with the connectors in a disengaged position.
Figure 6:
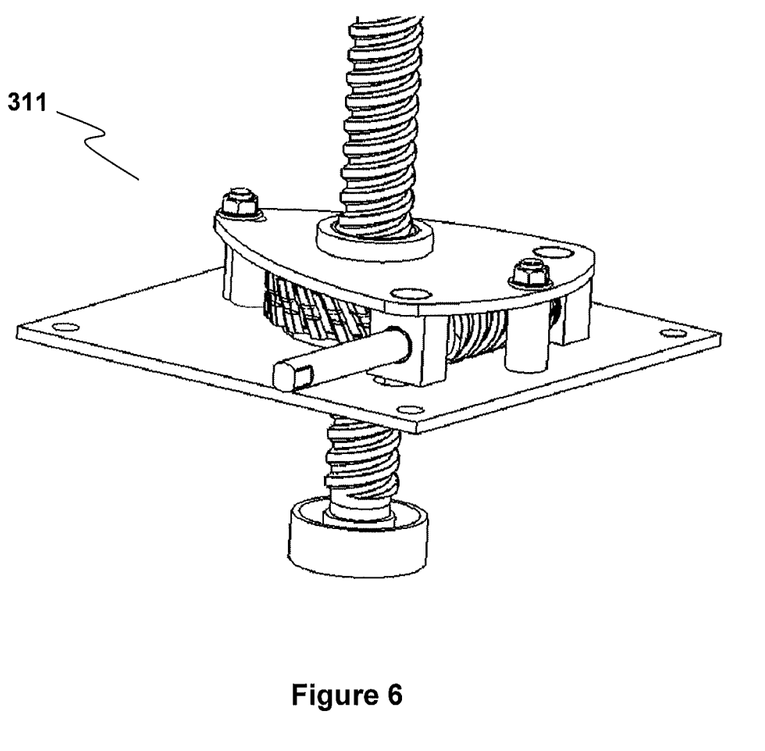
FIG. 6 shows the worm and worm wheel mechanism of the system of FIG. 3.

The vertical movement is achieved with a moving mechanism including a worm and worm wheel arrangement (311) as shown in FIG. 6. The worm and worm wheel arrangement (311) is located within a housing (310) and protected against atmospheric and/or environmental conditions such as moisture, dust etc. From the illustrations of FIGS. 3 to 5, it can be seen that the worm and worm wheel arrangement (311) is disposed at the bottom portion of a telescopic cylindrical guide (308). The upper end or portion of the telescopic cylindrical guide (308) is fixed to the bottom surface of the support structure (307) having a circuit breaker (302) and an instrument transformer (303). The worm and worm wheel arrangement (311) is provided with a handle (309) for operating the same in order to make movement of the telescopic cylindrical guide (308) in a vertical direction along its axis. The operation of the worm and worm wheel arrangement (311) and that of the mechanism for movement thereof can be provided by any of the possible mechanisms which may be manual or automated.

Figure 4:
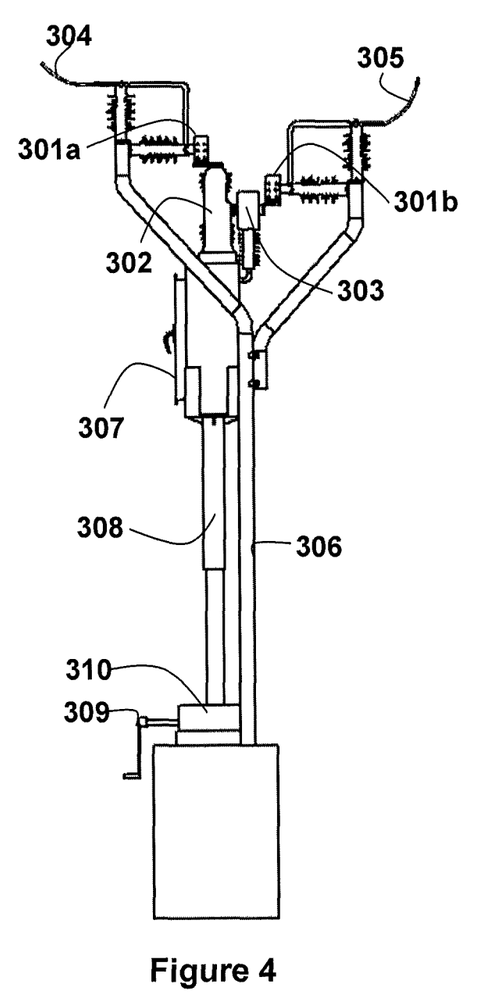
FIG. 4 shows the system of FIG. 3 with the connectors in an engaged position.

When the worm and worm wheel mechanism (311) is operated to effect an upward movement, the telescopic cylindrical guide (308) extends upward along with the structure (307) fixed to it being moved in a vertical upward direction. This allows the corresponding terminal of the circuit breaker (302) to engage with that of the incoming isolator (301a) and similarly the terminal of the instrument transformer (303) is engaged with that of the outgoing isolator (301b), thereby closing the contact of the electrical equipment as shown in FIG. 4.

However, the opening of the contacts can be made by disengaging the above associated terminals. This is caused by moving the terminals of the circuit breaker (302) and the instrument transformer (303) away from the terminals of the incoming isolator (301a) and outgoing isolator (301b). This is achieved by moving the electrical equipment in a vertically downward direction by operating the worm and worm wheel arrangement (311) accordingly. The electrical equipment hereby are isolated as shown in FIG. 5 asserting vertical isolation.

Figure 7:
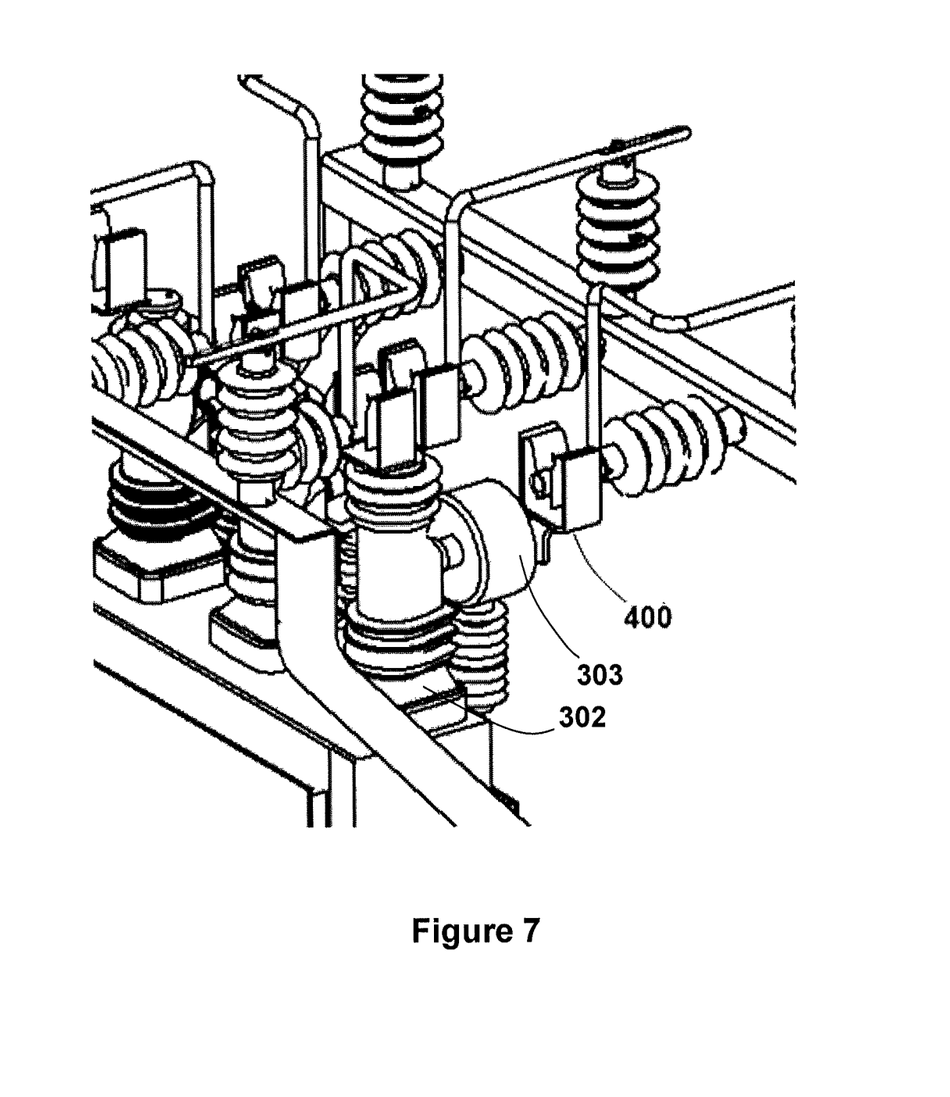
FIG. 7 shows the connectors of the system of FIG. 3 in an engaged position.
Figure 8:
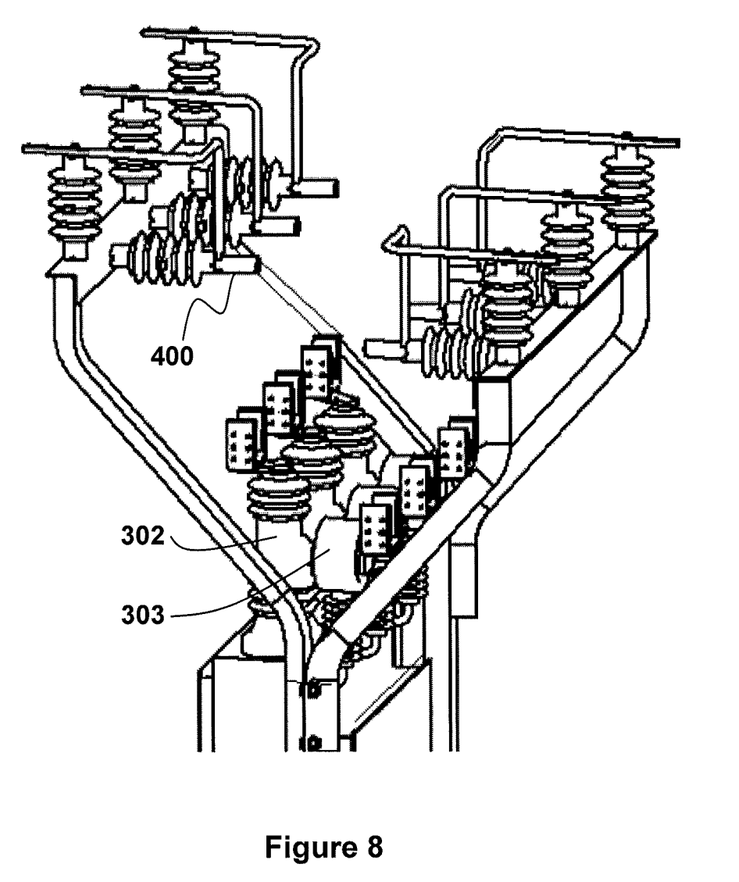
FIG. 8 shows the connectors of the system of FIG. 3 in a disengaged position.

The engagement and disengagement of the connectors (400) of the circuit breaker (302) and the incoming isolator (301a) can be clearly seen and understood from FIGS. 7 and 8. The connectors are generally used to make proper alignment of the terminals as stated throughout the description.

Figure 9:
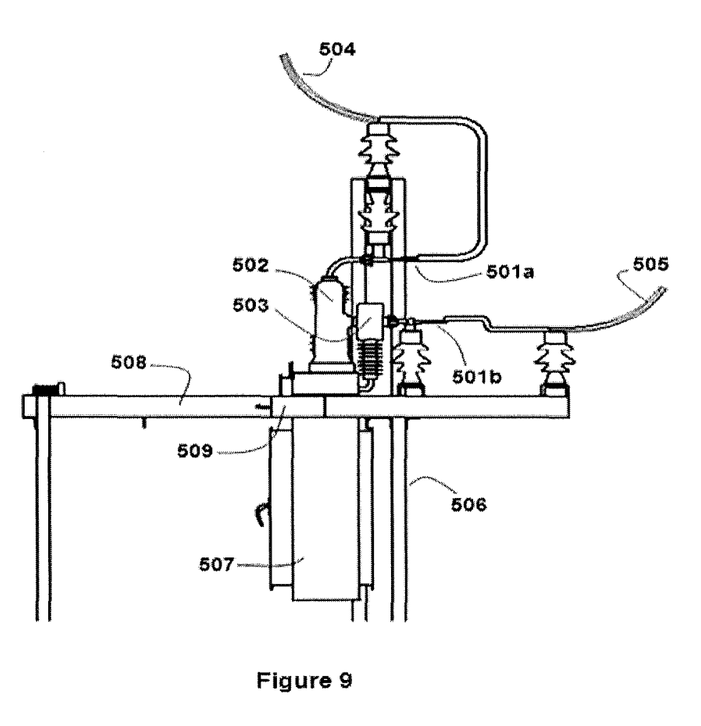
FIG. 9 shows a system with horizontal isolation according to an exemplary embodiment of the present disclosure with the connectors in an engaged position.
Figure 10:
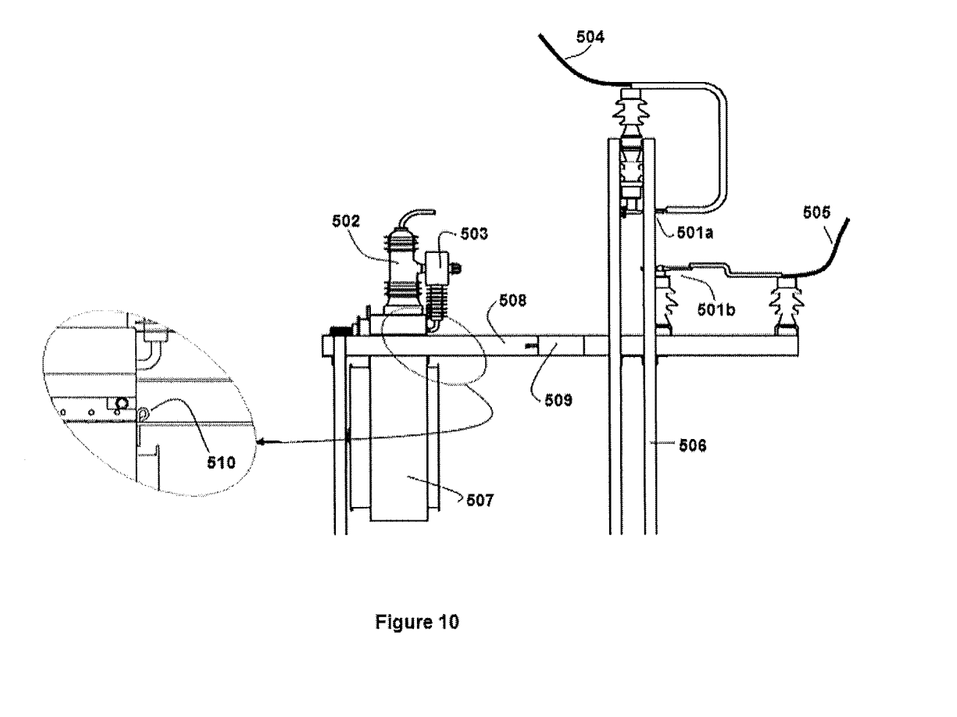
FIG. 10 shows the system of FIG. 9 with the connectors in a disengaged position.
Figure 11:
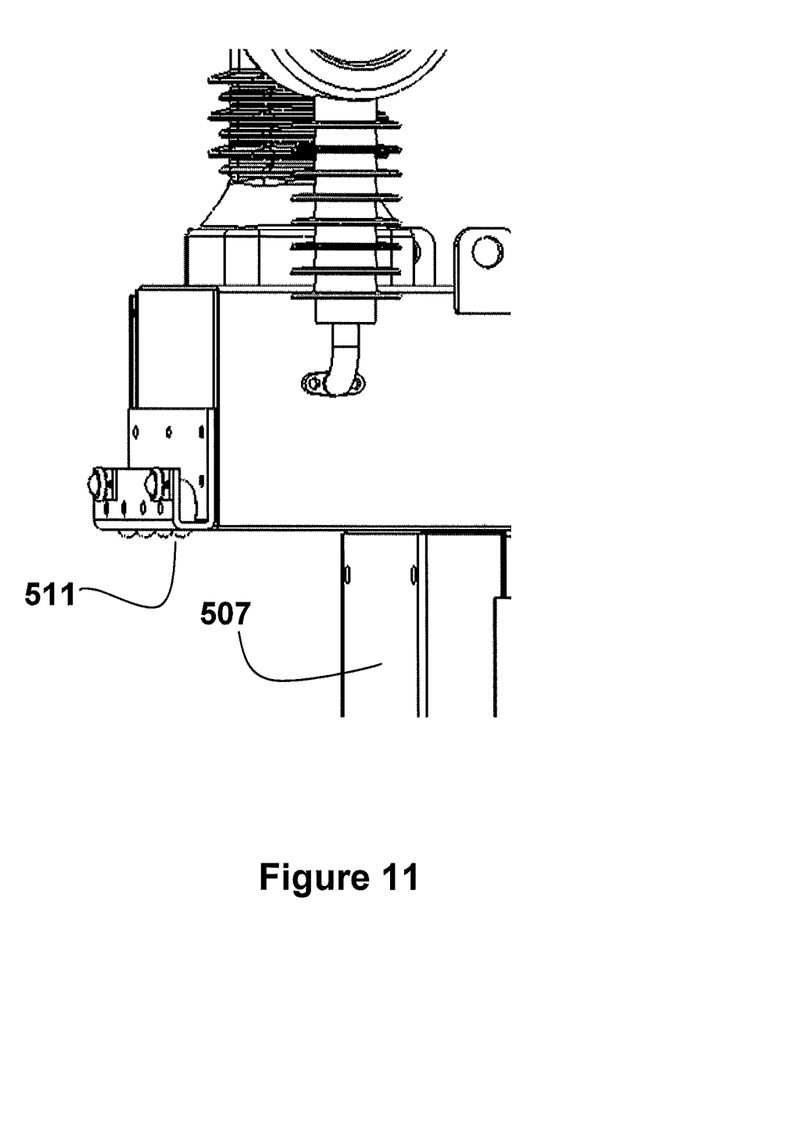
FIG. 11 shows the roller arrangement of the moving mechanism of the system illustrated in FIG. 9.

According to an exemplary embodiment of the present disclosure, a system having electrical equipment integrated on a structure with horizontal isolation is illustrated in FIGS. 9 to 11. Here, the circuit breaker (502) and the instrument transformer (503) are mounted on a support structure (507) containing the breaker mechanism and controls. The terminals of the circuit breaker (502) and the instrument transformer (503) are engaged and disengaged with the corresponding terminal of the incoming isolator (501a) and outgoing isolator (501b), thereby opening or closing the contact with the supply line (504) and distribution line (505) by a mechanism for isolation. This is particularly done by moving the electrical equipment (502, 503) in a horizontal direction for establishing such contact. The movement in a horizontal direction is effected by a moving mechanism intended to be the mechanism for isolation. The moving mechanism includes a guide way (508) and an arrangement of rollers (511) at the bottom of the support structure (507) having a circuit breaker (502) and an instrument transformer (503). The moving mechanism for horizontal isolation may be operated manually or may be automated. For instance, automatic way of operating the moving mechanism may include motor driven mechanism for causing the movement. It is noted that the movement is a controlled movement with proper precaution for appropriate alignments between contacts, engagement and locking of the moving equipment.

The rollers (511) are aligned to move within the guide way (508), thus providing a horizontal movement. In the engaged position as shown in FIG. 9, in which the structure (507) is moved to the possible position closest to the isolators (501a, 501b) and as allowed so as to make proper alignment of the connectors for engagement as herein before described. An interlock (509) is provided in the guide way (508) to lock the structure (507) having a circuit breaker (502) and an instrument transformer (503), to ensure proper alignment of the connectors. However, the movement of the structure (507) having the circuit breaker (502) and the instrument transformer (503) is arrested by a stopper pin (510) located in the guide way (508), when the structure (507) is in its farthest position away from the isolator and being isolated. This is to ensure proper isolation. The isolation by opening and closing the contact with the supply line or with the distribution line, or both, is carried out by the moving mechanism. The physical act of engagement or disengagement of terminals is referred as an operation. It is to be noted that the isolation is provided between the supply line and the distribution line both together with one operation. Isolation can also be provided separately for supply line and distribution line through the same or a different mechanism through more than one operation.

The concern of the size of the equipment and their ratings and the integrated setup thereof, its compactness, maintenance and its transportation are to be taken well within the scope of the present disclosure. The structure on which the electrical equipment are mounted can be designed for adjustment in which the structure or at least one section present in the structure is adjustable to provide flexibility of accommodating electrical equipment of different sizes, make and ratings. For instance, such adjustment could be provided by means of holed angles that can be move against one another and bolted at required positions.

The embodiments described hereinabove are exemplary in nature and are not exhaustive in light of the invention and are not limiting with regard to the scope of the invention and that all possible modification and alteration are to be construed well within the scope of the invention.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system having electrical equipment integrated on a structure, the system comprising:
   a first power switch electrically connected to a supply line located at one end of a single frame structure;
   a second power switch electrically connected to a distribution line having a physically spaced apart relationship to the first power switch;
   a circuit breaker constructed to be electrically connectable to the first power switch and an instrument transformer constructed to be electrically connectible to the second power switch, wherein the circuit breaker and the instrument transformer are mounted on a support structure and the circuit breaker is electrically connected to the instrument transformer; and
   a moving mechanism mechanically connected to the support structure for moving the support structure between a first position wherein one or more contacts of the circuit breaker are engaged with one or more contacts of the first power switch and one or more contacts of the instrument transformer are engaged with one or more contacts of the second power switch and a second position wherein one or more contacts of the circuit breaker are disengaged with one or more contacts of the first power switch and one or more contacts of the instrument transformer are disengaged with one or more contacts of the second power switch,
wherein the moving mechanism includes one of:
a vertical movement assembly including a telescopic guide affixed to one end of the support structure and a worm wheel mechanism housed in a housing, wherein the telescopic guide is mechanically connected to the worm wheel mechanism by a worm for vertical movement of the support structure between the first position and the second position; and
a horizontal movement assembly including a guide way located along the single frame structure and a roller assembly attached to the one end of the support structure for horizontal movement of the support structure between the first position and the second position.

2. The system as claimed in claim 1, wherein the system includes at least one of:
a power switch selected from the group consisting of an isolator and circuit breaker;
at least one power equipment selected from the group consisting of a distribution transformer, a current transformer, a voltage transformer; and
at least one power switch and at least one power equipment.

3. The system as claimed in claim 1, comprising:
a mechanism for isolation by opening and closing a contact with at least one of a supply line and a distribution line through one or more operations.

4. The system as claimed in claim 3, wherein the mechanism includes at least one of a handle and a moving mechanism configured to open and close the contact by engaging or disengaging at least one terminal of the electrical equipment correspondingly with the supply line and the distribution line.

5. The system as claimed in claim 3, wherein the moving mechanism is associated with (i) a movement in at least one of a vertical direction and a horizontal direction, and (ii) a movement that provides isolation.

6. The system as claimed in claim 4, wherein the mechanism is configured to be operated at least one of manually and automatically.

7. The system as claimed in claim 1, wherein the electrical equipment are arranged in one or more sections at a spaced apart relationship and mounted on the at least one structure, the structure being adjustable to accommodate the first power switch, the second power switch, and the circuit breaker.

8. The system as claimed as claimed in claim 1, wherein at least one of the first power switch, the second power switch, and the circuit breaker is fitted in the structure and tested at a factory.

9. The system as claimed in claim 3, wherein the mechanism is protected from environmental conditions.

10. A method for isolation of electrical equipment including a first power switch electrically connected to a supply line located at one end of a single frame structure; a second power switch electrically connected to a distribution line at least one electrical equipment located at having a physically spaced apart relationship and mounted on at least one structure to the first power switch; a circuit breaker constructed to be electrically connectable to the first power switch and an instrument transformer constructed to be electrically connectible to the second power switch, wherein the circuit breaker and the instrument transformer are mounted on a support structure and the circuit breaker is electrically connected to the instrument transformer; and a moving mechanism mechanically connected to the support structure for moving the support structure between a first position wherein one or more contacts of the circuit breaker are engaged with one or more contacts of the first power switch and one or more contacts of the instrument transformer are engaged with one or more contacts of the second power switch and a second position wherein one or more contacts of the circuit breaker are disengaged with one or more contacts of the first power switch and one or more contacts of the instrument transformer are disengaged with one or more contacts of the second power switch, wherein the moving mechanism includes one of: a vertical movement assembly including a telescopic guide affixed to one end of the support structure and a worm wheel mechanism housed in a housing, wherein the telescopic guide is mechanically connected to the worm wheel mechanism by a worm for vertical movement of the support structure between the first position and the second position; and a horizontal movement assembly including a guide way located along the single frame structure and a roller assembly attached to the one end of the support structure for horizontal movement of the support structure between the first position and the second position, the method comprising:
opening and closing a contact by engaging or disengaging one or more terminals of electrical equipment correspondingly with at least one of a supply line and a distribution line by a mechanism for isolation,
wherein the mechanism includes at least one of a handle and a moving mechanism which is associated with at least one of (i) movement in one of a vertical direction via the telescopic guide and the worm wheel and a horizontal direction via the roller assembly and the guide way, and (ii) movement that provides isolation.

11. The system as claimed in claim 2, comprising:
a mechanism for isolation by opening and closing a contact with at least one of a supply line and a distribution line through one or more operations.

12. The system as claimed in claim 11, wherein the mechanism includes at least one of a handle and a moving mechanism configured to open and close the contact by engaging or disengaging at least one terminal of the electrical equipment correspondingly with the supply line and the distribution line.

13. The system as claimed in claim 11, wherein the moving mechanism is associated with (i) a movement in at least one of a vertical direction and a horizontal direction, and (ii) a movement that provides isolation.

14. The system as claimed in claim 11, wherein the mechanism is configured to be operated at least one of manually and automatically.

15. The system as claimed in claim 11, wherein the mechanism is protected from environmental conditions.

16. The system as claimed in claim 4, wherein the first power switch, the second power switch, and the circuit breaker are arranged in one or more sections at a spaced apart relationship and mounted on the single frame structure, the structure being adjustable to accommodate the first power switch, the second power switch, and the circuit breaker.

17. The system as claimed in claim 5, wherein the first power switch, the second power switch, and the circuit breaker are arranged in one or more sections at a spaced apart relationship and mounted on the single frame structure, the structure being adjustable to accommodate the first power switch, the second power switch, and the circuit breaker.

18. The system as claimed in claim 12, wherein the first power switch, the second power switch, and the circuit breaker are arranged in one or more sections at a spaced apart relationship and mounted on the single frame structure, the structure being adjustable to accommodate the first power switch, the second power switch, and the circuit breaker.

19. The system as claimed in claim 13, wherein the first power switch, the second power switch, and the circuit breaker are arranged in one or more sections at a spaced apart relationship and mounted on the single frame structure, the structure being adjustable to accommodate the first power switch, the second power switch, and the circuit breaker.

20. The system as claimed in claim 19, wherein the mechanism is protected from environmental conditions.

\* \* \* \* \*